US012286010B2

(12) United States Patent
Kita et al.

(10) Patent No.: US 12,286,010 B2
(45) Date of Patent: Apr. 29, 2025

(54) ACCELERATOR DEVICE

(71) Applicant: DENSO CORPORATION, Kariya (JP)

(72) Inventors: Takuto Kita, Kariya (JP); Noriyuki Inagaki, Kariya (JP); Yuta Fujinaka, Kariya (JP); Hideyuki Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/608,020

(22) Filed: Mar. 18, 2024

(65) Prior Publication Data

US 2024/0217337 A1 Jul. 4, 2024

Related U.S. Application Data

(63) Continuation of application No. PCT/JP2022/038960, filed on Oct. 19, 2022.

(30) Foreign Application Priority Data

Oct. 22, 2021 (JP) .................................. 2021-173063

(51) Int. Cl.
*B60K 26/02* (2006.01)
*G05G 5/00* (2006.01)
(Continued)

(52) U.S. Cl.
CPC ............. *B60K 26/02* (2013.01); *G05G 5/005* (2013.01); *G05G 5/04* (2013.01); *G05G 5/05* (2013.01);
(Continued)

(58) Field of Classification Search
CPC ........ B60K 2026/023; B60K 2026/022; B60K 26/021; B60W 50/16
See application file for complete search history.

(56) References Cited

U.S. PATENT DOCUMENTS 11,813,939 B2 * 11/2023 Yoshida ................ G05G 5/005
2013/0091977 A1 * 4/2013 Fukushima .............. G05G 5/03
74/513
(Continued)

FOREIGN PATENT DOCUMENTS

DE 10208504 A1 * 9/2003 ............ B60K 26/021
DE 10238483 A1 * 3/2004 ............ B60K 26/021
(Continued)

OTHER PUBLICATIONS

USPTO Machine Translation (retrieved from FIT database) of the Description of DE 10238483 A1, Kirmse et al., Mar. 4, 2004. (Year: 2024).*

*Primary Examiner* — Daniel D Yabut
(74) *Attorney, Agent, or Firm* — Nixon & Vanderhye P.C.

(57) ABSTRACT

A power transmission mechanism of an accelerator device includes a first power transmission member, a second power transmission member, a coupling elastic member, and an actuator lever, and applies a reaction force to a pedal lever via the first power transmission member, the second power transmission member, and the actuator lever using a driving force of a drive source. The first power transmission member has a first stopper, and the driving force is transmitted to the first power transmission member. The second power transmission member has a second stopper that comes into contact with the first stopper. The first stopper and the second stopper are separated from each other in an initial state, and when the drive source is energized, and come into contact with each other when the first power transmission member is driven against an elastic force of the coupling elastic member by energizing the drive source.

5 Claims, 9 Drawing Sheets

(51) Int. Cl.
  *G05G 5/04* (2006.01)
  *G05G 5/05* (2006.01)
  *B60W 50/16* (2020.01)
  *G05G 5/28* (2006.01)
(52) U.S. Cl.
  CPC ........ *B60K 2026/023* (2013.01); *B60W 50/16* (2013.01); *G05G 5/28* (2013.01); *G05G 2505/00* (2013.01)

(56) References Cited

U.S. PATENT DOCUMENTS

| | | |
|---|---|---|
| 2023/0001787 A1 | 1/2023 | Hariu |
| 2023/0001789 A1 | 1/2023 | Kita |

FOREIGN PATENT DOCUMENTS

| | | | | |
|---|---|---|---|---|
| DE | 102011088281 A1 * | 6/2013 | ........... | B60K 26/021 |
| DE | 102013214371 A1 * | 1/2015 | ........... | B60K 26/021 |
| DE | 102015214490 A1 * | 2/2017 | | |
| WO | 2023276686 A1 | 1/2023 | | |

* cited by examiner

ACCELERATOR DEVICE

CROSS REFERENCE TO RELATED APPLICATIONS

This application is a continuation application of International Patent Application No. PCT/JP2022/038960 filed on Oct. 19, 2022, which designated the U.S. and based on and claims the benefits of priority of Japanese Patent Application No. 2021-173063 filed on Oct. 22, 2021. The entire disclosure of all of the above applications is incorporated herein by reference.

TECHNICAL FIELD

The present disclosure relates to an accelerator device.

BACKGROUND

Conventionally, an accelerator device including an actuator is known.

SUMMARY

An object of the present disclosure is to provide an accelerator device that appropriately applies a reaction force to a pedal lever.

The accelerator device of the present disclosure includes a pedal lever, a drive source, a power transmission mechanism, and a lock mechanism. The pedal lever operates in response to a depression operation. The drive source generates a driving force by being energized.

The power transmission mechanism includes a first power transmission member, a second power transmission member, a coupling elastic member, and an actuator lever, and is capable of applying a reaction force, which is a force in a direction opposite to a depression direction, to the pedal lever via the first power transmission member, the second power transmission member, and the actuator lever using the driving force of the drive source.

The first power transmission member has a first stopper, and the driving force of the drive source is transmitted to the first power transmission member. The second power transmission member has a second stopper that can come into contact with the first stopper. The coupling elastic member has one end locked to the first power transmission member and the other end locked to the second power transmission member.

The lock mechanism includes a locking member and a locked portion, and the locked portion is moved to a locking position by the driving force of the drive source and is locked by the locking member, thereby making it possible to regulate an operation of the pedal lever.

The first stopper and the second stopper are separated from each other in an initial state when the pedal lever is fully closed and an energization to the drive source is turned off, and come into contact with each other when the first power transmission member is driven against the elastic force of the coupling elastic member by energizing the drive source.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In an assumable example, an accelerator device including an actuator is known. For example, the accelerator device is configured to apply a reaction force to a pedal lever by a drive source and includes a locking mechanism that regulates an operation of the pedal lever.

In a configuration in which gears are connected by a torsion spring as in the accelerator device, a spring force of the torsion spring is set to be small in order to reduce a torque required for operating the lock. When applying a reaction force to the pedal lever, it is necessary to bend the torsion spring to a large extent, making it difficult to apply a large reaction force. An object of the present disclosure is to provide an accelerator device that appropriately applies a reaction force to a pedal lever.

The accelerator device of the present disclosure includes a pedal lever, a drive source, a power transmission mechanism, and a lock mechanism. The pedal lever operates in response to a depression operation. The drive source generates a driving force by being energized.

The power transmission mechanism includes a first power transmission member, a second power transmission member, a coupling elastic member, and an actuator lever, and is capable of applying a reaction force, which is a force in a direction opposite to the depression direction, to the pedal lever via the first power transmission member, the second power transmission member, and the actuator lever using the driving force of the drive source.

The first power transmission member has a first stopper, and the driving force of the drive source is transmitted to the first power transmission member. The second power transmission member has a second stopper that can come into contact with the first stopper. The coupling elastic member has one end locked to the first power transmission member and the other end locked to the second power transmission member. The actuator lever can come into contact with the pedal lever.

The lock mechanism includes a locking member and a locked portion, and the locked portion is moved to a locking position by the driving force of the drive source and is locked by the locking member, thereby making it possible to regulate an operation of the pedal lever.

The first stopper and the second stopper are separated from each other in an initial state when the pedal lever is fully closed and the energization to the drive source is turned off, and come into contact with each other when the first power transmission member is driven against the elastic force of the coupling elastic member by energizing the drive source. Thereby, the reaction force can be appropriately applied to the pedal lever.

One Embodiment

Figure 1:
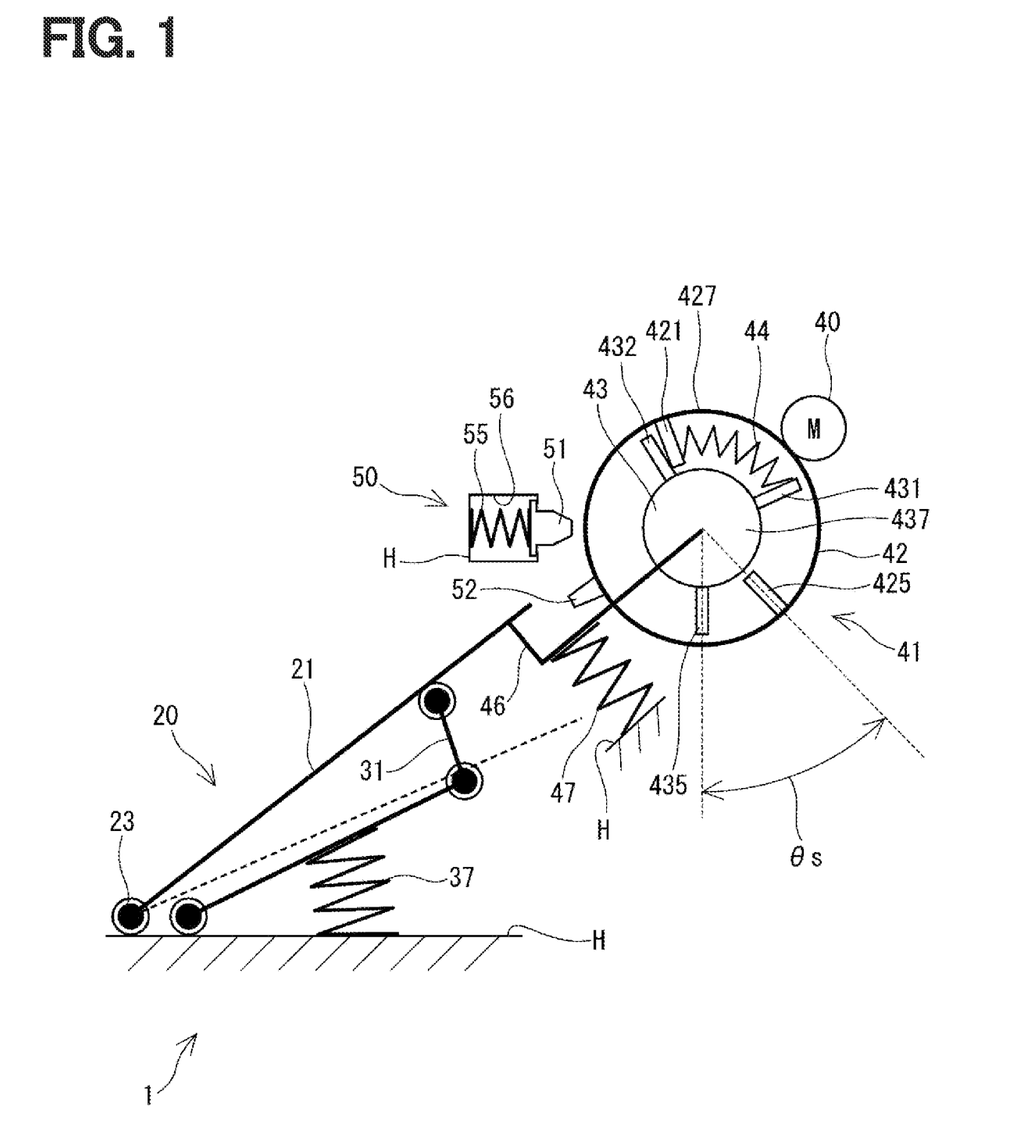
FIG. 1 is a schematic diagram showing an initial state of an accelerator device according to one embodiment.

Hereinafter, an accelerator device according to the present disclosure will be described with reference to the drawings. The accelerator device according to one embodiment is shown in FIGS. 1 to 9. As shown in FIG. 1, the accelerator device 1 includes a pedal lever 20, a motor 40, a power transmission mechanism 41, a lock mechanism 50, and the like.

The pedal lever 20 includes a pad 21, an arm 31, and a pedal 35, and all components are integrally driven by a driver's depression operation or the like. The pad 21 is provided to be operable by the driver's depression operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by operation of a motor 40 or a step-on operation of the pedal lever 20 are collectively referred to as a "housing H".

The arm 31 connects the pad 21 and the pedal 35. One end of the pedal 35 is rotatably supported by the housing H, and the other end of the pedal 35 is connected to the arm 31. With this arrangement, the pad 21, the arm 31, and the pedal 35 are integrally driven by an operation of the pad 21 by the driver. A pedal opening sensor (not shown) is provided at one end of the pedal 35 to detect a pedal opening.

A pedal biasing member 37 is a compression coil spring and is configured to bias the pedal 35 in an accelerator closing direction. One end of the pedal biasing member 37 is fixed to the pedal 35 and the other end of the pedal biasing member 37 is fixed to the housing H. In FIG. 1 and the like, the positions of the pads 21 when the accelerator is fully open and when the accelerator is fully closed are appropriately indicated by broken lines.

The motor 40 is, for example, a DC motor. The driving force of the motor 40 is transmitted to the pedal lever 20 via the power transmission mechanism 41. A series of components that transmits power from the motor 40, which is a drive source, to the pedal lever 20 via the power transmission mechanism 41 is referred to as an actuator.

The power transmission mechanism 41 includes a first power transmission member 42, a second power transmission member 43, a coupling spring 44, an actuator lever 46, a lever biasing member 47, and the like. The first power transmission member 42 includes a spring locking portion 421, a first stopper 425, and a main body portion 427, and is driven by the motor 40.

The spring locking portion 421 and the first stopper 425 are provided to protrude inward in a radial direction of the main body portion 427. The spring locking portion 421 locks one end of the coupling spring 44.

The second power transmission member 43 includes a spring locking portion 431, an initial locking portion 432, a second stopper 435, and a main body portion 437, and is provided radially inside the first power transmission member 42. The spring locking portion 431, the initial locking portion 432, and the second stopper 435 are provided to protrude outward in the radial direction of the main body portion 437.

The spring locking portion 431 locks the other end of the coupling spring 44. The initial locking portion 432 contacts the spring locking portion 421 of the first power transmission member 42 in the initial state. With this configuration, a set length of the coupling spring 44 is determined. The set load of the coupling spring 44 is set to be larger than the sum of a resistance force due to the magnetic resistance of the motor 40 and a friction force of the first power transmission member 42 when no current is applied. As a result, when the pedal lever 20 is depressed while the motor 40 is not energized, the first power transmission member 42 and the second power transmission member 43 rotate together.

The second stopper 435 is provided so as to be able to come into contact with the first stopper 425 when the first and second power transmission members 42 and 43 rotate relative to each other from the initial position. The coupling spring 44 is, for example, a compression coil spring, and is provided between the spring locking portions 421 and 431.

The actuator lever 46 has one end connected to the second power transmission member 43 and the other end abutted against the pad 21. Thereby, by driving the motor 40, a reaction force, which is a force in the accelerator closing direction, can be applied to the pedal lever 20 via the first power transmission member 42, the second power transmission member 43, and the actuator lever 46.

The lever biasing member 47 is a compression coil spring, and biases the actuator lever 46 in the reaction force applying direction. Thereby, the actuator lever 46 is always in contact with the pad 21.

The lock mechanism 50 includes a locking member 51, a locked portion 52, a locking elastic member 55, and the like. The locking member 51 has a tapered surface formed on one end side of the locking member 51 and is disposed such that the tapered surface is in contact with the locked portion 52 to be locked. The other end side of the locking member 51 is accommodated in a housing chamber 56 formed in the housing H and is provided to be reciprocally movable in the axial direction. The locked portion 52 is provided to protrude outward in the radial direction of the first power transmission member 42 and rotates together with the first power transmission member 42. The locked portion 52 comes into contact with the locking member 51 on the tapered surface of the locking member 51.

The locking elastic member 55 is housed in the housing chamber 56 provided in the housing H. One end of the locking elastic member 55 is in contact with the locking member 51, and the other end of the locking elastic member 55 is engaged with the housing H, whereby the locking elastic member 55 biases the locking member 51 toward the locked portion 52. In addition, FIG. 1 etc. all schematically show the accelerator device 1, and the shape and arrangement of each member may be different.

FIG. 1 shows an initial state of the accelerator device 1. In the initial state, the pedal lever 20 is in the fully closed position due to the biasing force of the pedal biasing member 37. Further, due to the biasing force of the coupling spring 44, the spring locking portion 421 and the initial locking portion 432 come into contact with each other. On the other hand, the first stopper 425 and the second stopper 435 are spaced apart. The angle between the stoppers 425 and 435 at this time is defined as an angle θs between the stoppers.

Figure 2:
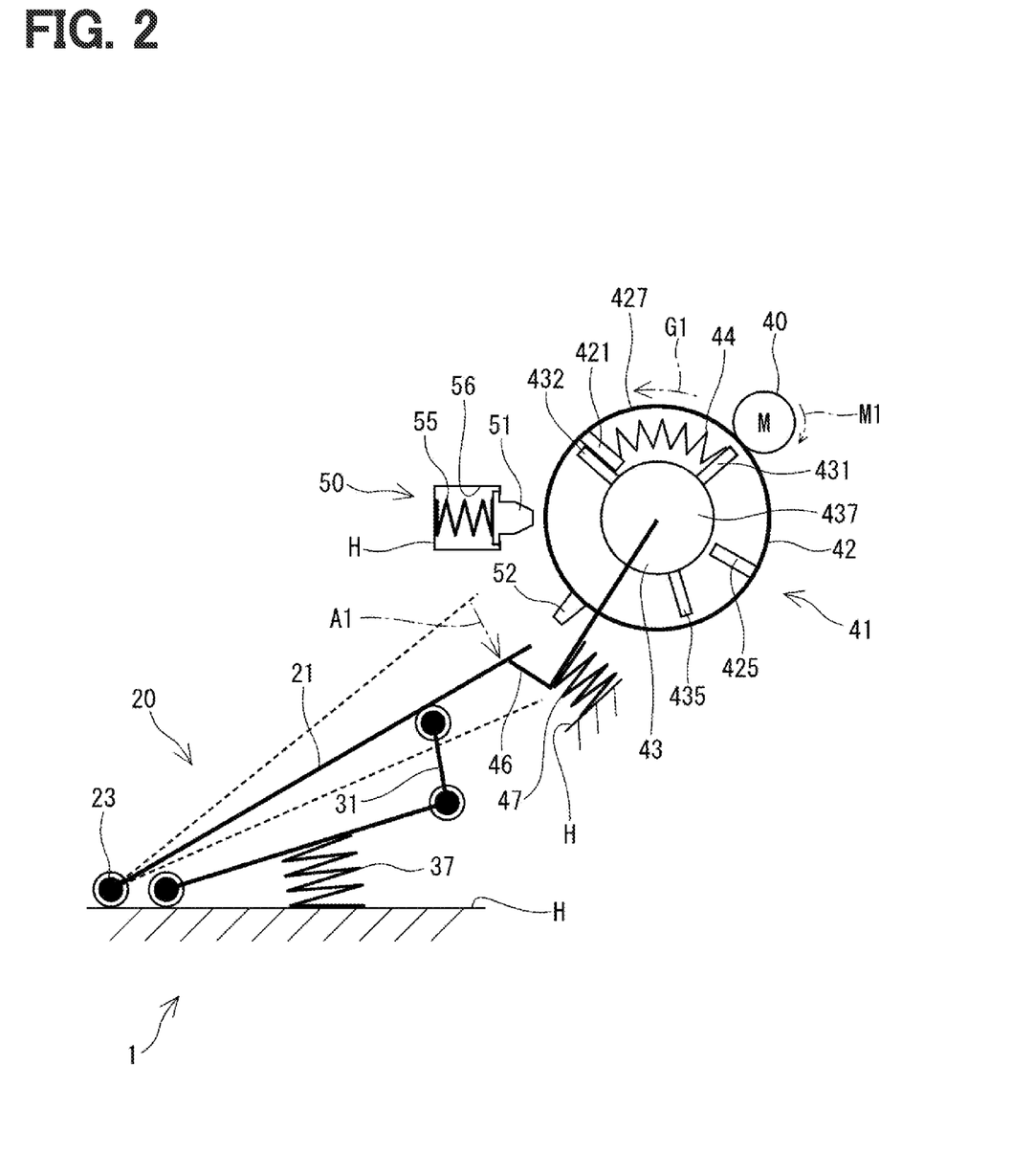
FIG. 2 is a schematic diagram showing a state in which a pedal lever is depressed without energization in the accelerator device according to one embodiment.

FIG. 2 shows a state in which the motor 40 is not energized and the pedal lever 20 is depressed by the driver. As shown by an arrow A1, when the pedal lever 20 is depressed in a non-energized state, as shown by an arrow G1, the second power transmission member 43 and the first power transmission member 42 rotate together in a counterclockwise direction in the drawing with the spring locking portion 421 and the initial locking portion 432 in contact with each other. Further, as shown by an arrow M1, the rotation of the first power transmission member 42 causes the motor 40 to rotate together with the first power transmission member 42. In FIG. 2 and the like, the arrows indicating the operations of each member are shown by dashed lines.

Figure 3:
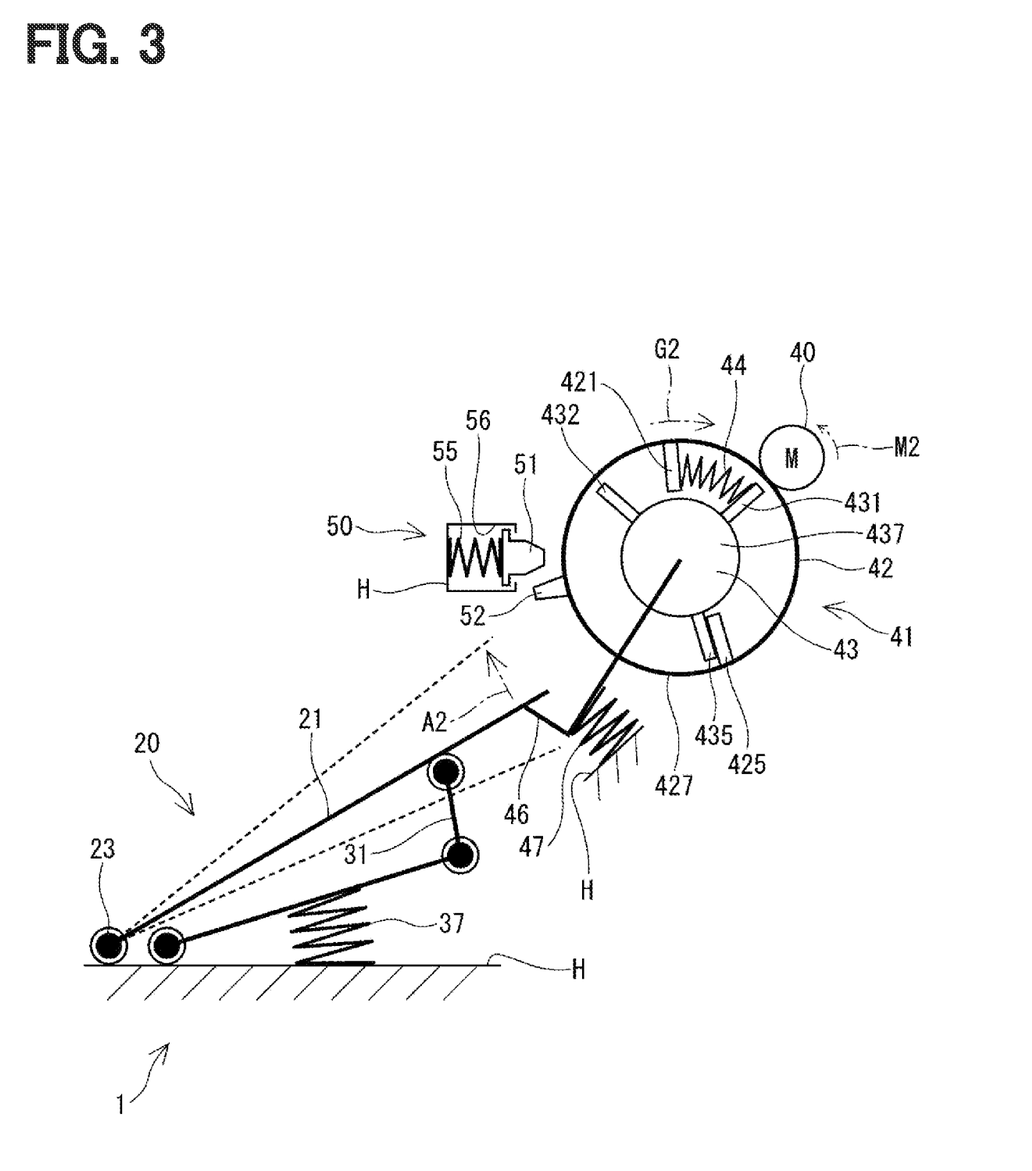
FIG. 3 is a schematic diagram illustrating a reaction force application in the accelerator device according to one embodiment.

FIG. 3 shows a state in which a reaction force is applied at an intermediate position where the pedal lever 20 is depressed. As shown by an arrow M2, when the motor 40 rotates in the reaction force applying direction, as shown by an arrow G2, the initial locking portion 432 and the spring locking portion 421 are separated from each other, and the coupling spring 44 is compressed. Furthermore, as the first stopper 425 and the second stopper 435 come into contact with each other, the first power transmission member 42 and the second power transmission member 43 rotate together in the clockwise direction in the drawing. As a result, the reaction force is applied to the pedal lever 20 via the actuator lever 46, as shown by an arrow A2.

Figure 4:
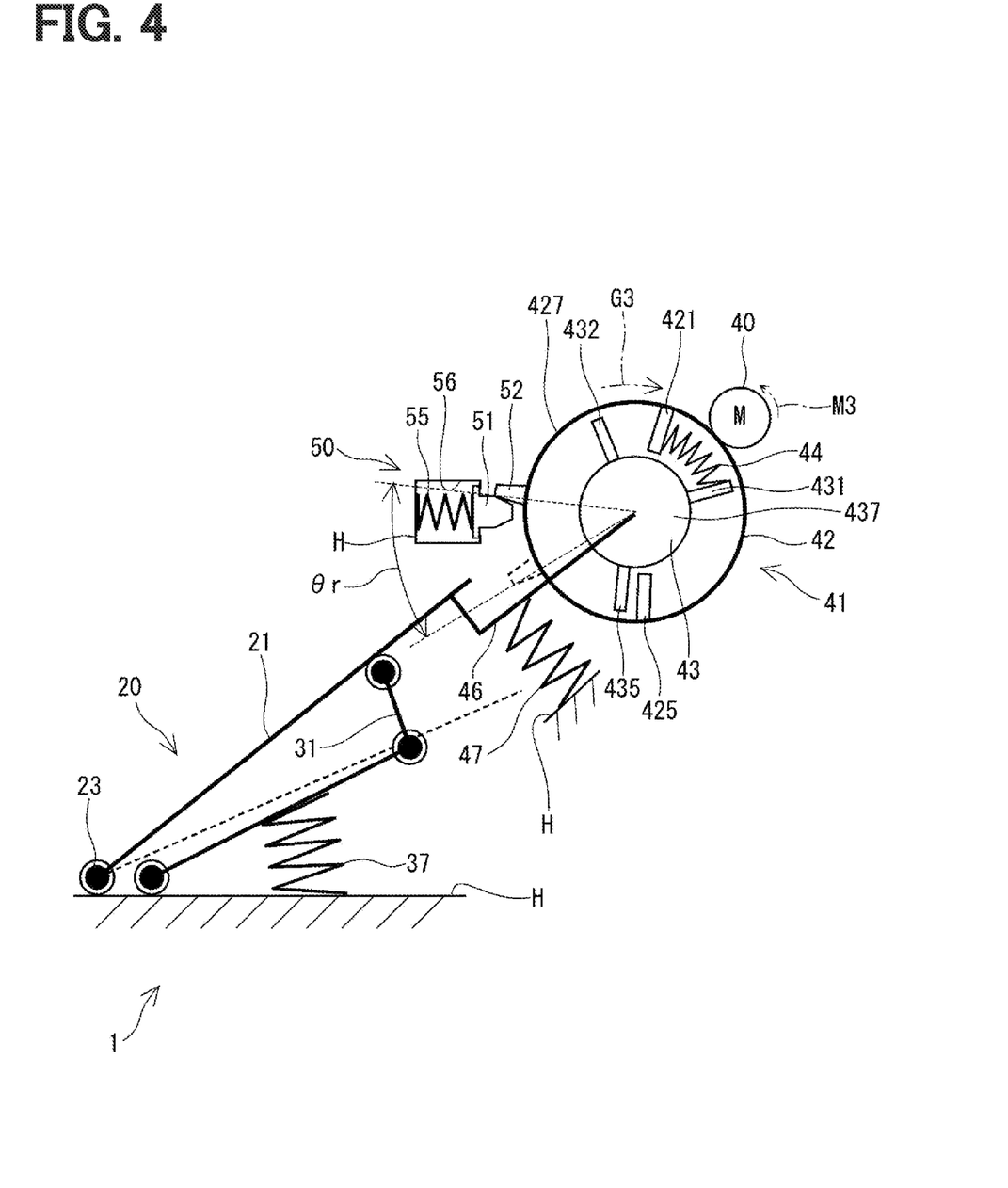
FIG. 4 is a schematic diagram showing a locked state of the accelerator device according to one embodiment.

FIG. 4 shows the pedal lever 20 in a locked state. In FIG. 4, the pedal lever 20 is in the fully closed position. When locking the pedal lever 20, when the motor 40 is driven from the initial state shown in FIG. 1 as shown by an arrow M3 in FIG. 4, the power transmission members 42 and 43 rotate while bending the coupling spring 44 as shown by an arrow G3. As a result, the locked portion 52 comes into contact with the locking member 51. When the motor 40 is further rotated with the locked portion 52 in contact with the locking member 51, the locking elastic member 55 is compressed and the locked portion 52 climbs over the locking member 51. When the locked portion 52 climbs over the locking member 51, the locking member 51 locks the locked portion 52 due to the elastic force of the locking elastic member 55, and restricts the rotation of the first power transmission member 42 in the counterclockwise direction in the drawing. With this configuration, the operation of the pedal lever 20 is restricted. Hereinafter, the state in which the operation of the pedal lever 20 is restricted by the lock mechanism 50 is referred to as a "locked state".

In FIG. 4, the initial position of the locked portion 52 is shown by a broken line. In the present embodiment, a lock setting angle θr, which is an angle formed by the position of the locked portion 52 in the initial position and the position of the locked portion 52 in the locked state, is set to be smaller than the angle θs between the stoppers (see FIG. 1) in the initial state. Therefore, in the locked state, the first stopper 425 and the second stopper 435 are separated from each other.

Figure 5:
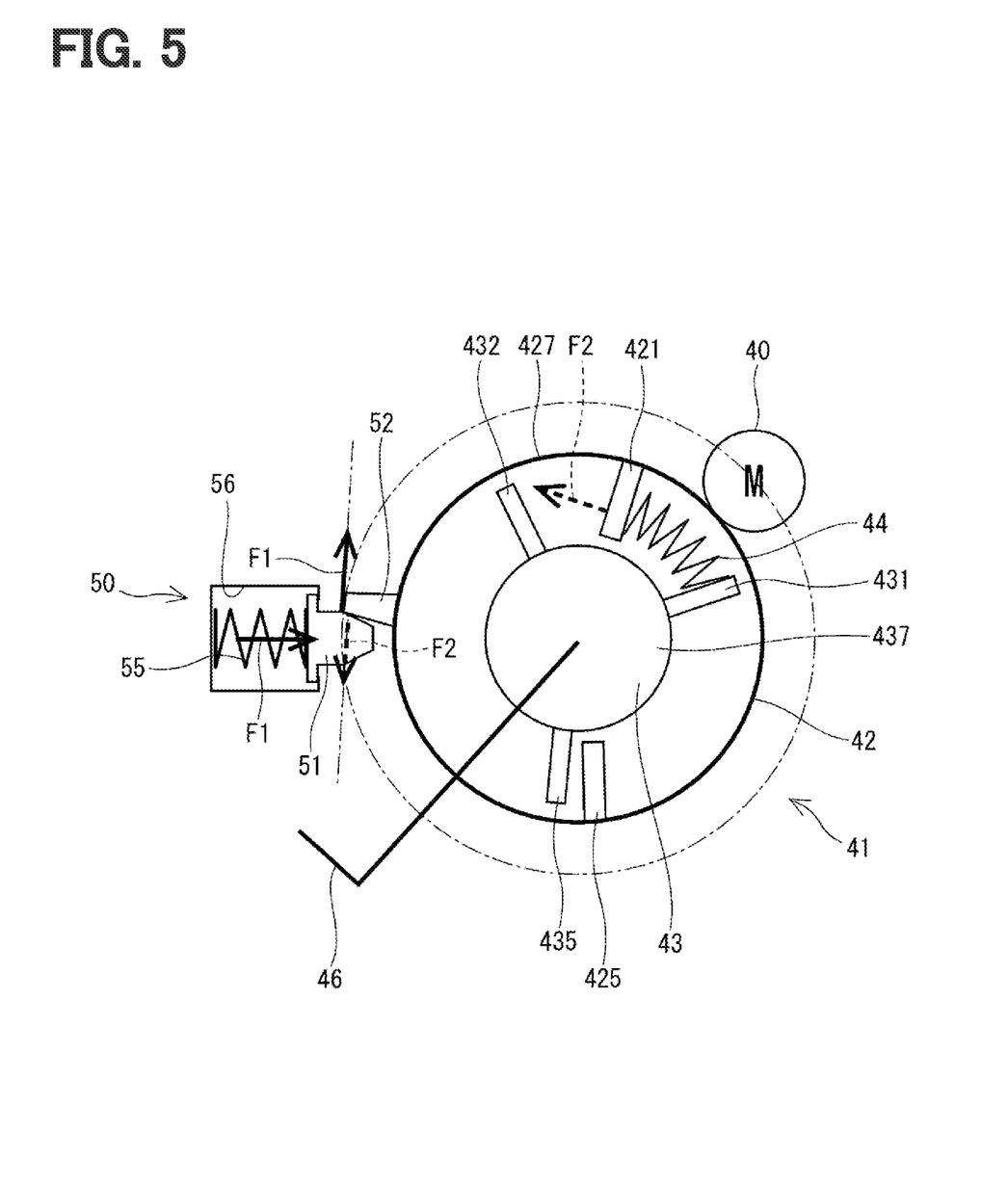
FIG. 5 is an explanatory diagram illustrating an elastic force of a coupling spring and a locking elastic member according to one embodiment.

The elastic forces of the coupling spring 44 and the locking elastic member 55 are explained based on FIG. 5. In FIG. 5, the elastic force of the locking elastic member 55 is shown as F1 by a solid line, and the elastic force of the coupling spring 44 is shown as F2 by a broken line. Further, the arrows indicating the force applied to the locking position are shown shifted for explanation. In the locked state, when a direction of the force applied to the contact point between the locking member 51 and the locked portion 52 is defined as a locking direction, it is designed to satisfy a relationship that the elastic force F1 is larger than the elastic force F2 in the locking direction. Thereby, the locked state can be maintained even if the power supply to the motor 40 is turned off.

Figure 6:
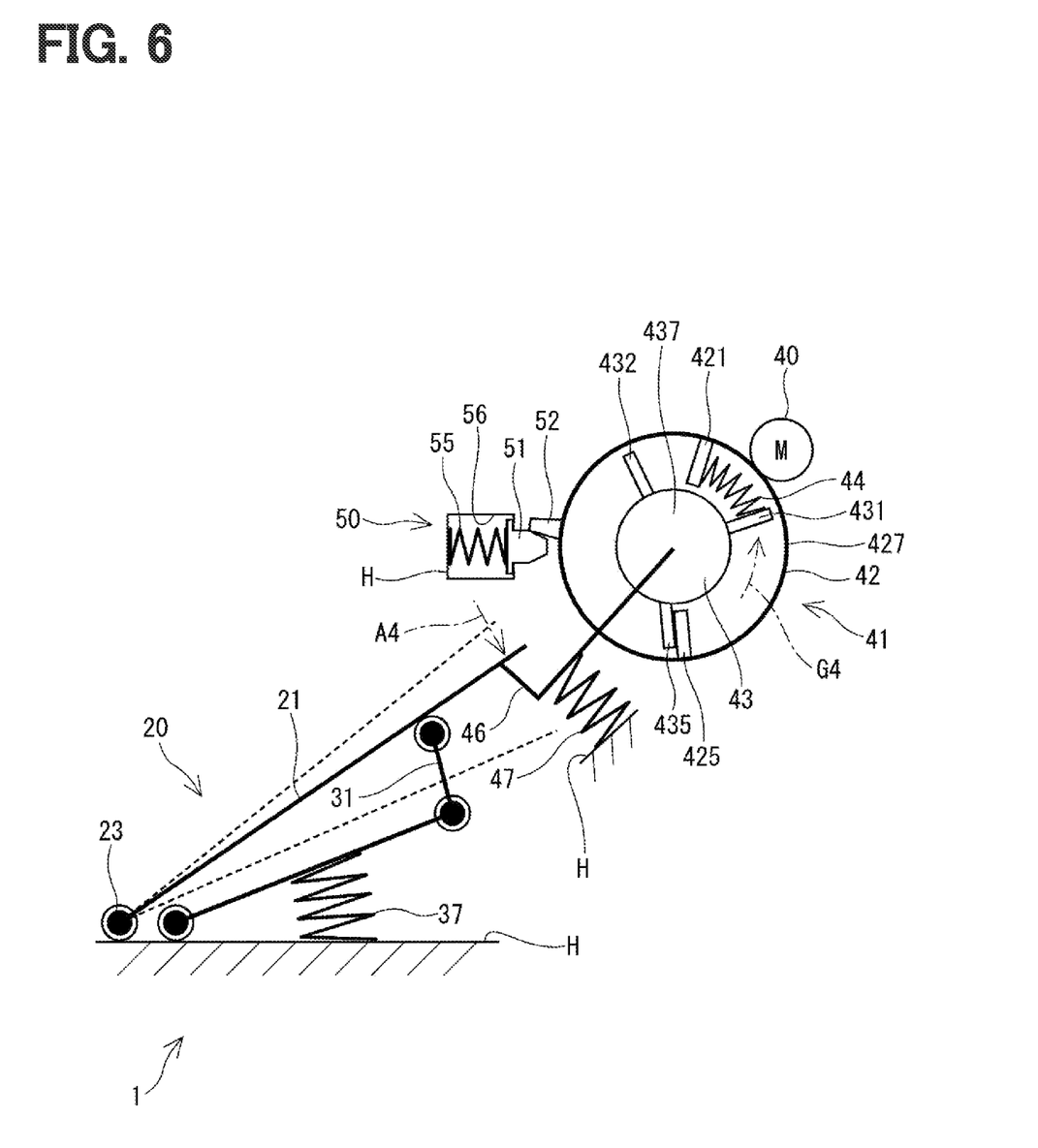
FIG. 6 is a schematic diagram illustrating unlocking in the accelerator device according to one embodiment.

Unlocking by depressing the pedal lever 20 is explained based on FIG. 6. As shown by an arrow A4, when the pedal lever 20 is depressed from the locked state (see FIG. 4) with a pedal force that exceeds the lock holding force, the second stopper 435 and first stopper 425 come into contact with each other. As shown by an arrow G4, the second power transmission member 43 and the first power transmission member 42 rotate together while compressing the coupling spring 44, so that the locked portion 52 compresses the locking elastic member 55 and climbs over the locking member 51. With this configuration, the locked state of the pedal lever 20 is released. The locked state can also be released by driving the motor 40 in a direction opposite to the locking direction indicated by the arrow M3 in FIG. 4.

Figure 7:
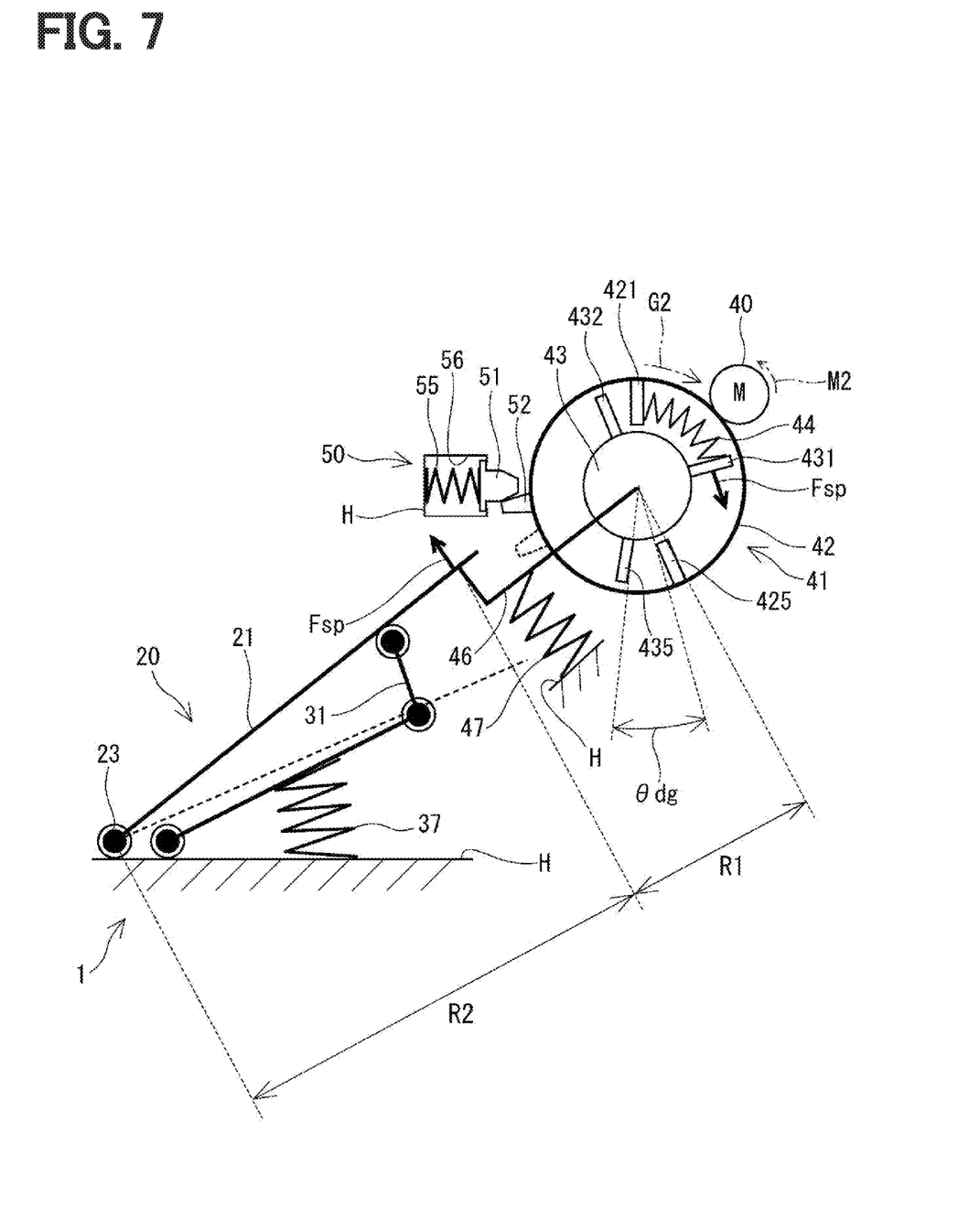
FIG. 7 is an explanatory diagram illustrating a dead zone of the accelerator device according to one embodiment.

The application of reaction force when the pedal lever 20 is near the fully closed position will be explained based on FIG. 7. As explained in FIG. 4, in the present embodiment, the angle θs between the stoppers is larger than the lock setting angle θr. Therefore, as shown in FIG. 7, when the motor 40 is driven in the reaction force applying direction in a state where the pedal lever 20 is near the fully closed position, the locked portion 52 contacts the locking member 51 first, and the first Stopper 425 and the second stopper 435 do not come into contact with each other. In this state, the reaction force Fsp applied to the pedal lever 20 becomes an elastic force equivalent to the deflection of the coupling spring 44, and a sufficient reaction force cannot be applied to the pedal lever 20.

When an angle range in which the stoppers 425 and 435 do not contact and cannot apply sufficient reaction force is defined as a reaction force dead zone angle, the reaction force dead zone angle θdg in the power transmission members 42 and 43 is expressed by an equation (1), and the reaction force dead zone angle θdp converted into the pedal opening is expressed by an equation (2). In the formula, R1 is a length of the actuator lever 46, R2 is a pad contact length that is a length from the fulcrum member 23 to the contact position of the actuator lever 46, and A is a reduction ratio between the actuator lever 46 and the power transmission member 43.

$$\theta dg = \theta s - \theta r \qquad (1)$$

$$\theta dp = \theta dg \times (R2/R1)/A \qquad (2)$$

Figure 8:
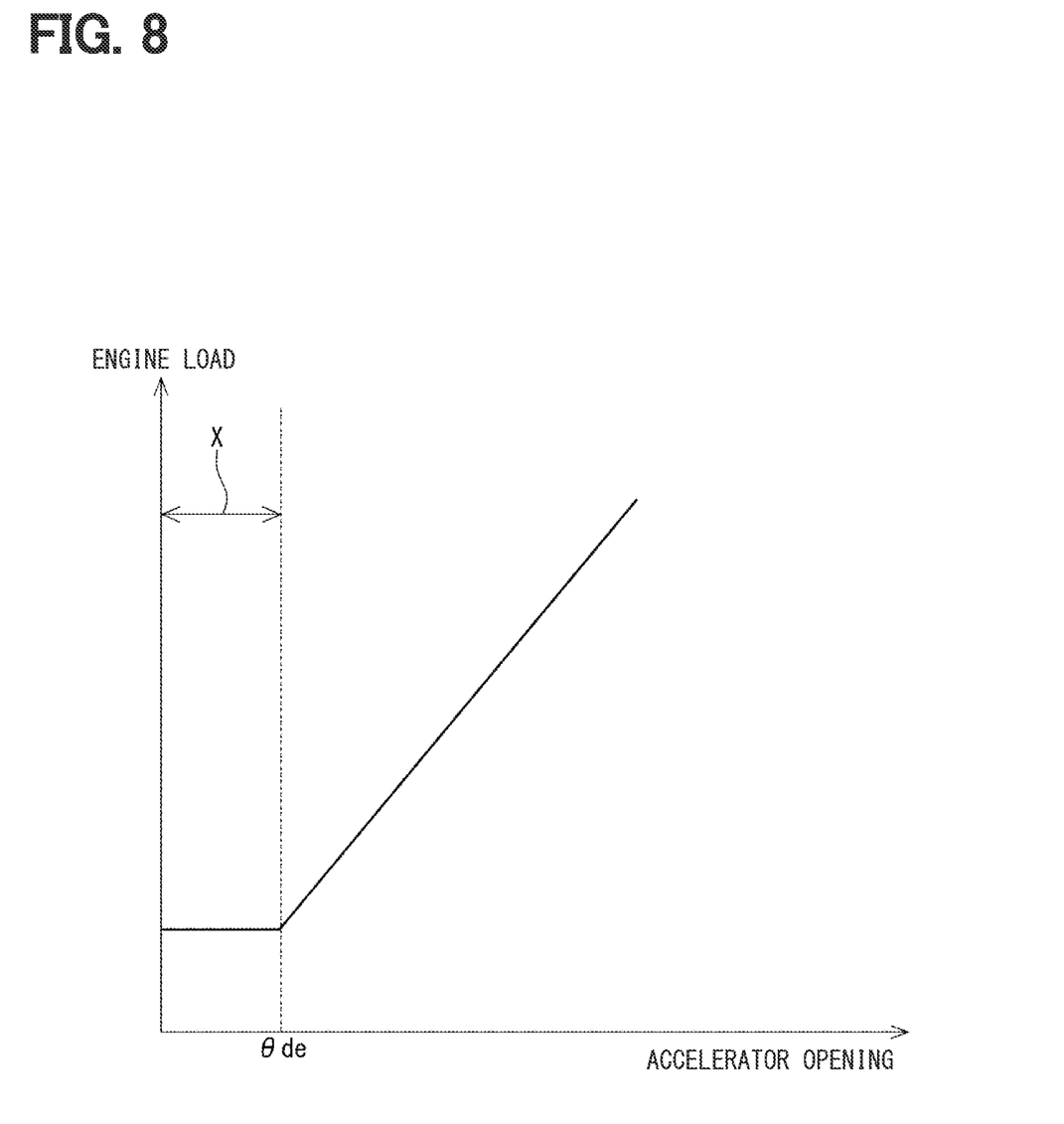
FIG. 8 is an explanatory diagram illustrating setting of a dead zone according to one embodiment.

By the way, as shown in FIG. 8, when the pedal lever 20 is depressed from a fully closed state, there is an engine output dead zone X until the engine output rises with respect to the accelerator opening. In a state where there is no output from the engine, there is little need for a notification operation such as giving a wall feeling by applying the reaction force, for example. Therefore, in the present embodiment, the reaction force dead zone angle θdp is set to be smaller than the engine output dead zone upper limit angle θde.

Figure 9:
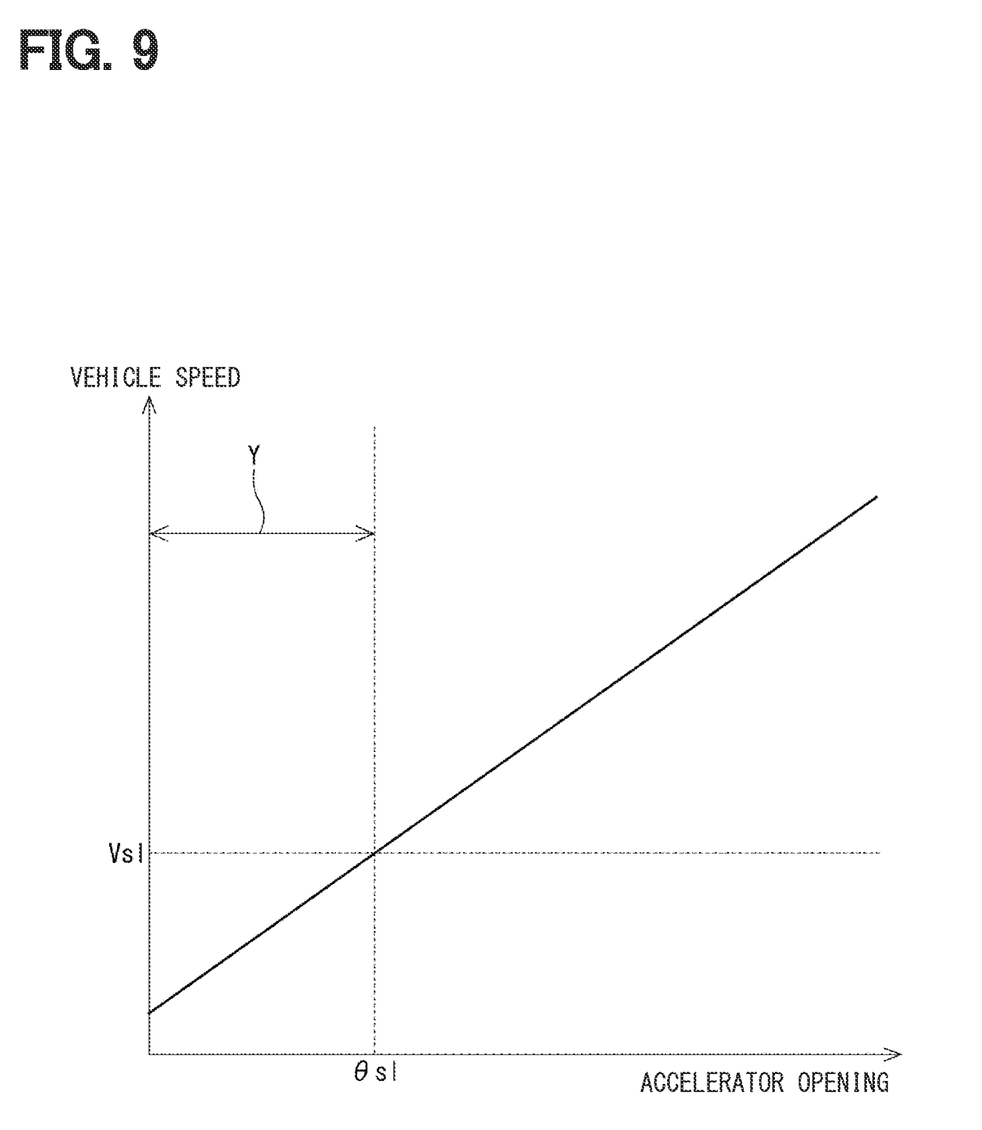
FIG. 9 is an explanatory diagram illustrating setting of a dead zone according to one embodiment.

Further, as shown in FIG. 9, in a slow speed range Y (for example, a vehicle speed of 10 [km/h] or less), the necessity of applying a reaction force is low. When the accelerator opening corresponding to a slow speed region upper limit speed Vsl is a slow speed region upper limit angle θsl, the reaction force dead zone angle θdp may be set to be smaller than the slow speed region upper limit angle θsl. In addition, in FIG. 8, the horizontal axis indicates the accelerator opening and the vertical axis indicates the engine load, and in FIG. 9, the horizontal axis indicates the accelerator opening and the vertical axis indicates the vehicle speed.

As explained above, the accelerator device 1 includes the pedal lever 20, the motor 40, the power transmission mechanism 41, and the lock mechanism 50. The pedal lever 20 operates in response to a depression operation. The motor 40 generates a driving force when energized.

The power transmission mechanism 41 includes the first power transmission member 42, the second power transmission member 43, the coupling spring 44, and the actuator lever 46, and applies the reaction force, which is a force in the opposite direction to the depression direction, to the pedal lever 20 via the first power transmission member 42, the second power transmission member 43, and the actuator lever 46 using the driving force of the motor 40.

The first power transmission member 42 has the first stopper 425, and the driving force of the motor 40 is transmitted thereto. The second power transmission member 43 has the second stopper 435 that can come into contact with the first stopper 425. The coupling spring 44 has one end locked to the first power transmission member 42 and the other end locked to the second power transmission member 43. The actuator lever 46 can come into contact with the pedal lever 20.

The lock mechanism 50 includes the locking member 51 and the locked portion 52. The locking portion 52 moves to a locking position by the driving force of the motor 40, and is locked to the locking member 51, thereby making it possible to restrict the operation of the pedal lever 20. In the present embodiment, the lock mechanism 50 can maintain the locked state in a non-energized state where the motor 40 is turned off.

Here, "the operation of the pedal lever can be restricted" is not limited to setting the movement amount to 0 by completely fixing the pedal lever 20, but is a concept including setting the movement amount to be smaller than that in the unlocked state.

The first stopper 425 and the second stopper 435 are separated from each other in an initial state in which the pedal lever 20 is fully closed and the power supply to the motor 40 is turned off, and come into contact with each other when the first power transmission member 42 is driven against the elastic force of the coupling spring 44 by energizing the motor 40. As a result, by driving the motor 40 while the stoppers 425 and 435 are in contact with each other, the driving force of the motor 40 can be directly applied as the reaction force to the pedal lever 20 via the power transmission members 42 and 43 without using the coupling spring 44.

The angle θs between the first stopper 425 and the second stopper 435 in the initial state is larger than the lock setting angle θr from a position of the locked portion 52 in the initial state to a position of the locked portion 52 in the locked state. Thereby, the pedal lever 20 can be appropriately locked.

The accelerator device 1 includes the lever biasing member 47 that biases the actuator lever 46 in the closing direction of the pedal lever 20. Thereby, the actuator lever 46 is in a state in which it is always in contact with the pedal lever 20, so that the responsiveness when applying a reaction force can be improved.

The set load of the coupling spring 44 in the initial state is greater than the resistance force between the motor 40 and the first power transmission member 42 in the non-energized state. As a result, when the pedal lever 20 is depressed in the non-energized state, the power transmission members 42 and 43 can rotate together. So, with the pedal lever 20 and the actuator lever 46 always in contact with each other, it is possible to eliminate the difference in pedal force when the pedal is pressed in the non-energized state.

The lock mechanism 50 includes a locking elastic member 55 that urges the locking member 51 to maintain the locked state. In the locked state, the load applied by the coupling spring 44 in the locking direction between the locking member 51 and the locked portion 52 is smaller than the load applied in the locking direction by the locking elastic member 55. Thereby, the locked state can be maintained in a state where the power to the motor 40 is turned off.

In the present embodiment, the motor 40 corresponds to a "drive source", the coupling spring 44 corresponds to a "coupling elastic member", the angle θs between stoppers corresponds to a "distance between stoppers", and the lock setting angle θr corresponds to a "lock setting distance".

Other Embodiments

In the above embodiments, the coupling elastic member is the compression coil spring. In other embodiments, the coupling elastic member may be a torsion spring. In the above embodiments, the locked portion is provided on the first power transmission member. In other embodiments, the locked portion may be provided on a member other than the first power transmission member constituting the power transmission mechanism. In another embodiment, the locking member is provided on the power transmission member side and the locked portion is provided on the housing side, and the locking member may be configured to be driven by the drive source to move the locked portion to the locking position.

In other embodiments, a speed reducer may be provided at least one between the drive source and the first power transmission member and between the second power transmission member and the actuator lever. The number of deceleration stages of the speed reducer is not limited to one stage, but may be two or more stages.

In the above embodiment, the actuator lever is brought into contact with the pedal lever by providing the lever biasing member. In other embodiments, the lever biasing member may be omitted and the actuator lever may not always be in contact with the pedal lever. In the above embodiments, the power transmission mechanism is capable of applying force in the return direction to the pedal lever. In other embodiments, the power transmission mechanism may be configured to be able to apply a force in the depression direction to the pedal lever in addition to the force in the return direction. Further, the configuration of the power transmission mechanism may be different from the above embodiments. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:
1. An accelerator device, comprising:
a pedal lever configured to operate in response to a pedal operation;

a drive source configured to generate a driving force by an energization;

a power transmission mechanism including a first power transmission member having a first stopper and to which the driving force of the drive source is transmitted, a second power transmission member having a second stopper configured to come into contact with the first stopper, a coupling elastic member having one end locked to the first power transmission member and the other end locked to the second power transmission member, and an actuator lever configured to come into contact with the pedal lever, and being configured to apply a reaction force, which is a force in a direction opposite to a depression direction, to the pedal lever via the first power transmission member, the second power transmission member, and the actuator lever by the driving force of the drive source; and a lock mechanism including a locking member and a locked portion, and being configured to regulate an operation of the pedal lever by moving the locked portion to a locking position by the driving force of the drive source and being locked by the locking member; wherein the first stopper and the second stopper are separated from each other in an initial state when the pedal lever is fully closed and the energization to the drive source is turned off, and come into contact with each other when the first power transmission member is driven against an elastic force of the coupling elastic member by energizing the drive source.

2. The accelerator device according to claim 1, wherein a distance between the first stopper and the second stopper in the initial state is greater than a lock setting distance from the position of the locked portion in the initial state to the position of the locked portion in a locked state.

3. The accelerator device according to claim 1, further comprising:

a lever biasing member configured to bias the actuator lever in a closing direction of the pedal lever.

4. The accelerator device according to claim 3, wherein a set load of the coupling elastic member in the initial state is larger than a resistance force between the drive source and the first power transmission member in a non-energized state.

5. The accelerator device according to claim 1, wherein the lock mechanism includes a locking elastic member that urges the locking member to maintain a locked state, and in the locked state, a load applied by the coupling elastic member in a locking direction between the locking member and the locked portion is smaller than a load applied in the locking direction by the locking elastic member.

\* \* \* \* \*